United States Patent
Chen et al.

(10) Patent No.: US 12,141,513 B2
(45) Date of Patent: Nov. 12, 2024

(54) METHOD TO MAP CONVOLUTIONAL LAYERS OF DEEP NEURAL NETWORK ON A PLURALITY OF PROCESSING ELEMENTS WITH SIMD EXECUTION UNITS, PRIVATE MEMORIES, AND CONNECTED AS A 2D SYSTOLIC PROCESSOR ARRAY

(71) Applicant: International Business Machines Corporation, Armonk, NY (US)

(72) Inventors: Chia-Yu Chen, Yorktown Heights, NY (US); Jungwook Choi, Chappaqua, NY (US); Kailash Gopalakrishnan, San Jose, CA (US); Vijayalakshmi Srinivasan, New York, NY (US); Swagath Venkataramani, Yonkers, NY (US); Jintao Zhang, Princeton, NJ (US)

(73) Assignee: International Business Machines Corporation, Armonk, NY (US)

( * ) Notice: Subject to any disclaimer, the term of this patent is extended or adjusted under 35 U.S.C. 154(b) by 1025 days.

(21) Appl. No.: 16/177,017

(22) Filed: Oct. 31, 2018

(65) Prior Publication Data
US 2020/0134105 A1 Apr. 30, 2020

(51) Int. Cl.
*G06F 30/3323* (2020.01)
*G06F 111/04* (2020.01)
(Continued)

(52) U.S. Cl.
CPC ........... *G06F 30/3323* (2020.01); *G06N 3/04* (2013.01); *G06N 3/063* (2013.01); *G06F 2111/04* (2020.01)

(58) Field of Classification Search
CPC ............. G06F 30/3323; G06F 2111/04; G06N 3/04; G06N 3/063; G06N 3/0445; G06N 3/082; G06N 3/105; G06N 3/0454
See application file for complete search history.

(56) References Cited

U.S. PATENT DOCUMENTS

2015/0261702 A1  9/2015  Culurciello
2016/0062947 A1  3/2016  Chetlur
(Continued)

FOREIGN PATENT DOCUMENTS

EP    2 833 295 A2       2/2015
WO    WO 2015/191652 A1  12/2015
WO    WO 2016/141282 A1  9/2016

OTHER PUBLICATIONS

Kung, Hsiang-Tsung, Bradley McDanel, and Sai Qian Zhang. "Mapping systolic arrays onto 3d circuit structures: Accelerating convolutional neural network inference." 2018 IEEE International Workshop on Signal Processing Systems (SiPS). IEEE, 2018. (Year: 2018).*

(Continued)

*Primary Examiner* — Miranda M Huang
*Assistant Examiner* — Sidney Vincent Bostwick
(74) *Attorney, Agent, or Firm* — Kimberly Zillig (57) ABSTRACT

A method for improving performance of a predefined Deep Neural Network (DNN) convolution processing on a computing device includes inputting parameters, as input data into a processor on a computer that formalizes a design space exploration of a convolution mapping, on a predefined computer architecture that will execute the predefined convolution processing. The parameters are predefined as guided by a specification for the predefined convolution processing to be implemented by the convolution mapping and by a microarchitectural specification for the processor that will execute the predefined convolution processing. The processor calculates performance metrics for executing the predefined convolution processing on the computing device, as functions of the predefined parameters, as proxy estimates of performance of different possible design choices to implement the predefined convolution processing.

18 Claims, 11 Drawing Sheets

(51) Int. Cl.
*G06N 3/04* (2023.01)
*G06N 3/063* (2023.01)

(56) References Cited

U.S. PATENT DOCUMENTS

| | | | |
|---|---|---|---|
| 2016/0162782 A1 | 6/2016 | Park | |
| 2016/0342893 A1 | 11/2016 | Ross | |
| 2016/0379073 A1 | 12/2016 | Pan | |
| 2019/0244086 A1* | 8/2019 | Franca-Neto | ........ G06N 3/0445 |

OTHER PUBLICATIONS

Li, Youjie, et al. "A network-centric hardware/algorithm co-design to accelerate distributed training of deep neural networks." 2018 51st Annual IEEE/ACM International Symposium on Microarchitecture (MICRO). IEEE, 2018. (Year: 2018).*
Wang, Hai, et al. "Enhanced efficiency 3D convolution based on optimal FPGA accelerator." IEEE Access 5 (2017): 6909-6916. (Year: 2017).*
Yang, Tien-Ju, Yu-Hsin Chen, and Vivienne Sze. "Designing energy-efficient convolutional neural networks using energy-aware pruning." Proceedings of the IEEE conference on computer vision and pattern recognition. 2017. (Year: 2017).*
Fujii, Tomoya, Shimpei Sato, and Hiroki Nakahara. "A threshold neuron pruning for a binarized deep neural network on an FPGA." IEICE Transactions on Information and Systems 101.2 (2018): 376-386. (Year: 2018).*
Filter (convolution), Machine Learning Glossary (https://machinelearning.wtf/terms/filter-convolution/), 2017 (Year: 2017).*
Haria, Swapnil, Mark D. Hill, and Michael M. Swift. "Devirtualizing memory in heterogeneous systems." Proceedings of the Twenty-Third International Conference on Architectural Support for Programming Languages and Operating Systems. 2018. (Year: 2018).*
Huan, Yuxiang, et al. "A 3d tiled low power accelerator for convolutional neural network." 2018 IEEE International Symposium on Circuits and Systems (ISCAS). IEEE, 2018. (Year: 2018).*
Guo, Kaiyuan, et al. "A survey of FPGA-based neural network accelerator." arXiv preprint arXiv:1712.08934 (2017). (Year: 2017).*
Lakhani, Salim, et al. "2D matrix multiplication on a 3D systolic array." Microelectronics journal 27.1 (1996): 11-22. (Year: 1996).*
Mel, et al. "The NIST Definition of Cloud Computing". Recommendations of the National Institute of Standards and Technology. Nov. 16, 2015.
Stylianos, et al., "A Framework for Mapping Convolutional Neural Networks on FPGAs", Field-Programmable Custom Computing Machines, (FCCM), 2016, IEE, 2016.
Wang, et al. "Convolutional Decoding on Deep-pipelined SIMD Processor with Flexible Parallel Memory",. Digital System Design (DSD), 2012, IEEE, 2012.
Chen et al. (2014). DianNao: a small-footprint high-throughput accelerator for ubiquitous machine-learning. In Proceedings of the 19th international conference on Architectural support for programming languages and operating systems (ASPLOS '14). Association for Computing Machinery, New York, NY, USA, 269-284. https://doi.org/10.1145/2541940.2541967.
Chen, YH et al. (2016). "Eyeriss: A Spatial Architecture for Energy-Efficient Dataflow for Convolutional Neural Networks," 2016 ACM/IEEE 43rd Annual International Symposium on Computer Architecture (ISCA), Seoul, Korea (South), 2016, pp. 367-379, doi: 10.1109/ISCA.2016.40.
Du, Z. et al. (2015). "ShiDianNao: Shifting vision processing closer to the sensor," 2015 ACM/IEEE 42nd Annual International Symposium on Computer Architecture (ISCA), Portland, OR, USA, 2015, pp. 92-104, doi: 10.1145/2749469.2750389.
Lin, WM. et al. (1991) "Algorithmic mapping of neural network models onto parallel SIMD machines," in IEEE Transactions on Computers, vol. 40, No. 12, pp. 1390-1401, Dec. 1991, doi: 10.1109/12.106224.
Zhang, C. et al. (2015). Optimizing FPGA-based Accelerator Design for Deep Convolutional Neural Networks. In Proceedings of the 2015 ACM/SIGDA International Symposium on Field-Programmable Gate Arrays (FPGA '15). Association for Computing Machinery, New York, NY, USA, 161-170. https://doi.org/10.1145/2684746.2689060.
Zhang, C. et al. (2016). Caffeine: Towards uniformed representation and acceleration for deep convolutional neural networks, 2016 IEEE/ACM International Conference on Computer-Aided Design (ICCAD), Austin, TX, USA, 2016, pp. 1-8, doi: 10.1145/2966986.2967011.

* cited by examiner

Analysis for RaPiD: R=C=S=L=8 on VGG Conv4-2

VGG Conv4-2: $\{N_{in}, N_{out}, N_{ij}, N_{mb}, N_{kij}\} = \{512, 512, 784, 9, 1\}$ Choose which data array to be kept in LRF: $X = Ker, H = Inp, V = Out$ Find the mapped dimensions $PEcol, PErow, LRF, SIMD$ based on Rules

$PEcol \subseteq DIM_X \cap DIM_V = \{out\}; PErow \subseteq DIM_X \cap DIM_H = \{in, kij\}$ $LRF = \begin{cases} LRF_{X \cap V} \subseteq DIM_X \cap DIM_V = \{out\} & or \\ LRF_{X \cap H} \subseteq DIM_X \cap DIM_H = \{in, kij\} & or \\ LRF_{H \cap V} \subseteq DIM_X \cap DIM_H \cap DIM_V = \emptyset \end{cases}$ $SIMD = \begin{cases} SIMD_{X \cap V} \in DIM_X \cap DIM_V = \{out\} & or \\ SIMD_{X \cap H} \in DIM_X \cap DIM_H = \{in, kij\} & or \\ SIMD_{H \cap V} \in DIM_H \cap DIM_V = \{ij, mb\} \end{cases}$ Choose a dimension from each of $\{PEcol, PErow, LRF, SIMD\}$ $PEcol = \{out\}, PErow = \{in\}, LRF = \{in\}, SIMD = \{out\}, ITER = \{ij, mb\}$ $\{|PEcol|, |PErow|, |LRF|, |SIMD|, |ITER|\} = \{8, 8, 8, 8, 784\}$ Calculate $PEUtil, ReqBW(A), Overhead(A)$ $ReqBW(Inp) = 16\ B/cy, ReqBW(Out) = 32\ B/cy, Overhead(Ker) = 64\ cycles$ $PEUtil = \dfrac{MinCycles}{EstmCycles} = \dfrac{3612672}{3612672 + 36864} = 0.99$

FIG. 6

Analysis for RaPiD: R=C=S=L=8 on VGG FC

VGG.Conv4-2: $\{N_{in}, N_{out}, N_{ij}, N_{mb}, N_{kij}\} = \{12K, 1K, 1, 8, 1\}$ Choose which data array to be kept in LRF: $X = Inp, H = Ker, V = Out$ Find the mapped dimensions $PEcol, PErow, LRF, SIMD$ based on Rules

$PEcol \subseteq DIM_X \cap DIM_V = \{mb\}; PErow \subseteq DIM_X \cap DIM_H = \{in\}$ $LRF = \begin{cases} LRF_{X \cap V} \subseteq DIM_X \cap DIM_V = \{mb\} & or \\ LRF_{X \cap H} \subseteq DIM_X \cap DIM_H = \{in\} & or \\ LRF_{H \cap V} \subseteq DIM_X \cap DIM_H \cap DIM_V = \emptyset \end{cases}$ $SIMD = \begin{cases} SIMD_{X \cap V} \in DIM_X \cap DIM_V = \{mb\} & or \\ SIMD_{X \cap H} \in DIM_X \cap DIM_H = \{in\} & or \\ SIMD_{H \cap V} \in DIM_H \cap DIM_V = \{out\} \end{cases}$ Choose a dimension from each of $\{PEcol, PErow, LRF, SIMD\}$ $PEcol = \{mb\}, PErow = \{in\}, LRF = \{in\}, SIMD = \{in\}, ITER = \{out\}$ $\{|PEcol|, |PErow|, |LRF|, |SIMD|, |ITER|\} = \{8, 8, 1, 8, 784\}$ Calculate $PEUtil, ReqBW(A), Overhead(A)$ $ReqBW(Inp) = 16\ B/cy, ReqBW(A), Overhead(A)$
$ReqBW(Inp) = 16\ B/cy, ReqBW(Out) = 32\ B/cy, Overhead(Ker) = 64\ cycles$ $PEUtil = \dfrac{MinCycles}{EstmCycles} = \dfrac{3612672}{3612672+36864} = 0.99$

FIG. 7

Pruning Invalid Design Choices

Given MicroArchSpec = $\{R, C, L, S, AvailBW\}$
  and NetworkSpec = $\{N_{in}, N_{out}, N_{ij}, N_{mb}, N_{kij}\}$
Given additional constraints, e.g., *MinExpectedPEUtil*
For any choice of $X \in \{Ker, Inp, Out\}$
  Initialize *ValidOptions* = ∅
  For all the possible mappings from $\{PEcol, PErow, LRF, SIMD\}$
    Calculate $ReqBW(X), ReqBW(H), ReqBW(V)$
    If $ReqBW(X) + ReqBW(H) + ReqBW(V) > AvailBW$ ⇒
      Return Invalid
    Calculate *PEUtil*
    If $PEUtil < MinExpectedPEUtil$ ⇒ Return Invalid
    $ValidOptions = ValidOptions \cup \{PEcol, PErow, LRF, SIMD\}$

FIG. 8

Proposing Best Configuration for MicroArchSpec

Given NetworkSpec = $\{N_{in}, N_{out}, N_{ij}, N_{mb}, N_{kij}\}$

Given additional constraints, e.g., $MinExpectedPEUtil, AvailBW,$
$\{R_{max}, C_{max}, L_{max}, S_{max}\}$ Sweeping over $\{r, c, l, s \mid r \leq R_{max}, c \leq C_{max}, l \leq L_{max}, s \leq S_{max}\}$ Initialize $BestArchConfig = \emptyset, MaxPEUtil = 0$ For any choice of $X \in \{Ker, Inp, Out\}$     For all the possible mappings from $\{PEcol, PErow, LRF, SIMD\}$         Calculate $ReqBW(X), ReqBW(H), ReqBW(V)$         If $((ReqBW(X) + ReqBW(H) + ReqBW(V) > AvailBW)$ ⇒
        Continue;

If $(PEUtil > MaxPEUtil)$ ⇒ $MaxPEUtil = PEUtil;$
        $BestArchConfig = \{r, c, l, s\}$ Return $BestArchConfig$

METHOD TO MAP CONVOLUTIONAL LAYERS OF DEEP NEURAL NETWORK ON A PLURALITY OF PROCESSING ELEMENTS WITH SIMD EXECUTION UNITS, PRIVATE MEMORIES, AND CONNECTED AS A 2D SYSTOLIC PROCESSOR ARRAY

The present invention relates generally to convolutional neural networks and, more specifically, a method to discover a mapping for optimal performance given predefined parameters over a convolution specification and a microarchitecture specification.

BACKGROUND

Convolutional neural networks (CNNs) are widely used for various computer vision applications such as image classification. The most time-consuming computation kernel in CNN is three-dimensional (3D) convolution (also referred to herein as "Cony"), which takes almost 90% of total execution time. Awareness of this computation burden has motivated extensive research on custom hardware acceleration for CNNs.

One of the most promising architectures includes a 2D systolic processor with a plurality of Processing Elements (PEs) with Single Instruction Multiple Data (SIMD) execution units and private memories such as the Local Register Files (LRFs) described later or scratch-pad memory that could be attached alongside the 2D array. However, flexibility in the organization of this systolic data flow architecture as well as large variability in the Cony specifications have hindered efficient exploration of all possible Cony mappings.

Traditionally, for application specific programmable accelerators, only manual mapping of the Cony algorithm exists. Such manual explorations of the design space are not scalable especially as the size of the problems for the algorithms and the specification of the Cony algorithm continue to grow, along with the additional aspect of design choices of the accelerator architecture itself.

In the context of the present invention, an accelerator can be considered as a category of computer hardware that is designed specifically for accelerating speed and energy efficiency of a certain set of applications. Hardware in this category is typically equipped with customized arithmetic computing unit often called a "Processing Element (PE)", as used herein. In general, a PE is usually different from a typical Central Processing Unit (CPU) in a way that a CPU's architecture is rather standardized, which is to say that it consists of the pipelined data-path with program counter, instruction/data memory, register file, etc. In contrast, a PE's composition varies depending on its target application, but often it is computation-oriented and lacks the programming capability associated with a CPU.

Both the LRF and SIMD units are popular components of PE or CPU architectures. Local register file is a set of registers (a memory element) that can temporarily store input operands or the output of arithmetic unit. SIMD stands for "Single Instruction Multiple Data", meaning how many data elements are processed in parallel in the arithmetic unit in a PE.

Most prior arts on Deep Neural Networks (DNN) accelerators do not explore various Cony mappings to the processing elements. For example, one conventional method proposed specific data flows mapped to their own multi-PE accelerator architectures, but this approach included little exploration of the best data flow. Another recent attempt to map Cony to Field-Programmable Gate Array (FPGA)-based accelerators provides design space exploration for Cony mapping, but this exploration is based on a fixed data flow. Furthermore, although 2D PE array architectures are known to be energy/performance efficient, there is no prior work that systematically explores all the possible mapping options for the 2D array SIMD+LRF architectures with streaming data flow in consideration that the number of SIMD lanes and the number of LRF entries can have arbitrary sizes.

It is noted that DNNs are often used as a very general terms of covering all kinds of neural network structures typically stacked into deep layers. Convolutional neural networks (CNNs) are one of the categories in DNN, most popular in computer vision domain. The reason for its popularity in computer vision is that CNN's key computation, "convolution" is very useful for extracting features in the images, which is a very critical feature for most computer vision applications. There are other kinds of neural nets. For example, recurrent neural networks (RNNs) are another popular category, which has a feedback path in the network connection to capture time-dependent information in data.

In view of these and other problems in the art, the present inventors have recognized that there is a need to improve computational capability of architectures executing DNN processing.

SUMMARY

The present invention provides a systematic method to explore a design space and finds an optimal convolution mapping for a given MicroArchitecture (MicroArch) specification. That is, the invention provides a general analysis framework with arbitrary sizes of SIMD and LRF, and various 2D array structures. In the context of the present invention as focusing on 2D PE array architecture, a MicroArch includes the definition of the underlying computer architecture, including the number of rows (PEROW) and columns (PECOL) of the 2D PE array, as well as the size of SIMD and LRF inside each PE.

More specifically, the present inventors have recognized that the convolution processing can be modeled by identifying parameters of the MicroArch, of data of images being processed, and of the convolutional kernel that would permit performance and efficiency of the convolutional processing to be quantified and optimized. Thus, the present invention provides a method to systematically explore all potential Cony mapping options, to estimate performance metrics (e.g., PE utilizations and/or available bandwidth), and to prune invalid mapping options and architecture configurations to achieve desired performance goals, including low energy and high throughput.

In the context of the present invention, the term "convolution mapping" refers to determining which dimensions of the data structures are assigned to which PE location at which time, so that each PE in a 2D array gets the right sequence of data for convolution computation. Due to the 2D grid structure, as well as the SIMD and LRF features of the 2D PE array, the amount of data reuse and computational efficiency varies on how these dimensions are mapped.

The present invention discloses a method to parameterize the design space of this convolution mapping and provides a systematic exploration scheme. This scheme can be extended to, but not limited to, quantitatively evaluate mapping options as well as proposing a preferred microarchitecture.

Thus, the present patent provides a systematic method to evaluate a mapping using the parameterized hardware settings described herein. This mechanism can be used in a very general form to provide service for either finding the best mapping or proposing new hardware configurations. Additionally, the method could be used as a part of a software runtime application that runs a platform into a hardware accelerator. The calculations described herein could be accessible by users as a calculator application on a network server or via a cloud service.

The term "microarchitecture", herein also abbreviated as "MicroArch", refers to the way a given instruction set architecture (ISA), is implemented in a particular processor. A given ISA may be implemented with different microarchitectures, and implementations may vary due to different goals of a given design or due to shifts in technology.

In an exemplary embodiment, the present invention provides a method for improving performance of a predefined convolution processing on a computing device includes inputting parameters, as input data into a processor on a computer that formalizes a design space exploration of a convolution mapping, on a predefined computer architecture that will execute the predefined convolution processing. The parameters are predefined as guided by a specification for the predefined convolution processing to be implemented by the convolution mapping and by a microarchitectural specification for the processor that will execute the predefined convolution processing. The processor calculates performance metrics for executing the predefined convolution processing on the computing device, as functions of the predefined parameters, as proxy estimates of performance of different possible design choices to implement the predefined convolution processing.

Also described herein is a method for exploring a design space for mapping convolutional layers of deep neural networks onto a plurality of processing elements connected as a 2-dimensionsl (2D) systolic processor array, including inputting parameter values into a processor on a computer from a microarchitecture specification that defines configuration aspects of the processing elements; inputting parameter values into the processor from a specification that defines a convolutional processing; and calculating, by the processor, performance metrics for executing the convolution processing on the 2D systolic processor array, as functions of the predefined parameters, as proxy estimates of performance of different possible design choices to implement the predefined convolution processing.

Also described herein is an apparatus, including a processor; and a memory device accessible by the processor, the memory device storing a set of instructions that permit the processor to execute a method of optimizing a mapping of convolutional layers of deep neural networks onto a plurality of processing elements connected as a 2-dimensionsl (2D) systolic processor array. The method includes: inputting parameter values into a processor on a computer from a microarchitecture specification that defines configuration aspects of the processing elements; inputting parameter values into the processor from a specification that defines a convolution processing; calculating, by the processor, performance metrics for executing the convolution processing on the 2D systolic processor array, as functions of the predefined parameters, as proxy estimates of performance of different possible design choices to implement the convolution processing; inputting one or more constraints that permit the processor to eliminate invalid design choices; and determining an optimal mapping onto the 3D systolic processor array for the convolution processing.

Other details and embodiments of the invention will be described below, so that the contribution of the present invention to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

Although a preferred embodiment described herein mostly on convolution layers, the method of the present invention is not limited to convolution. In fact, a fully-connected layer can be thought as a reduced version of a Cony layer, where the size of feature map and the kernel become one.

For example, in convolution, Output[Nmb][Nout][Nij]+= Kernel[Nout][Nin][Nkij]*Input[Nmb][Nin][Nij+Kij], whereas in a fully-connected layer (Nij and Nkij dims are reduced): Output[Nmb][Nout]+=Kernel[Nout][Nin]*Input[Nmb][Nin].

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
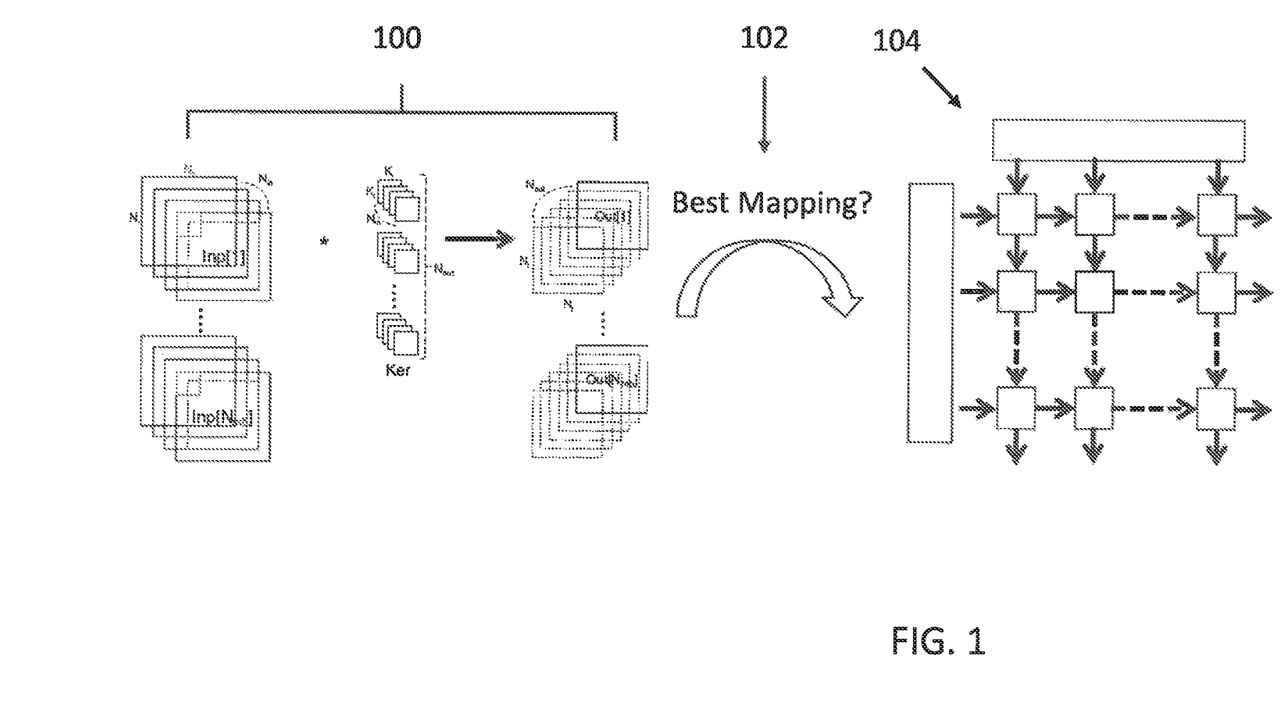
FIG. 1 exemplarily shows the goal of the present invention as finding the optimal convolutional mapping for image groups onto a 2D systolic processor grid.

The invention will now be described with reference to FIG. 1, which exemplarily demonstrates the present invention as developed as a method to discover the best mapping 102 for convolutional processing 100 of a group of images onto a 2D-systolic array 104 of processing elements (PE).

Figure 2:
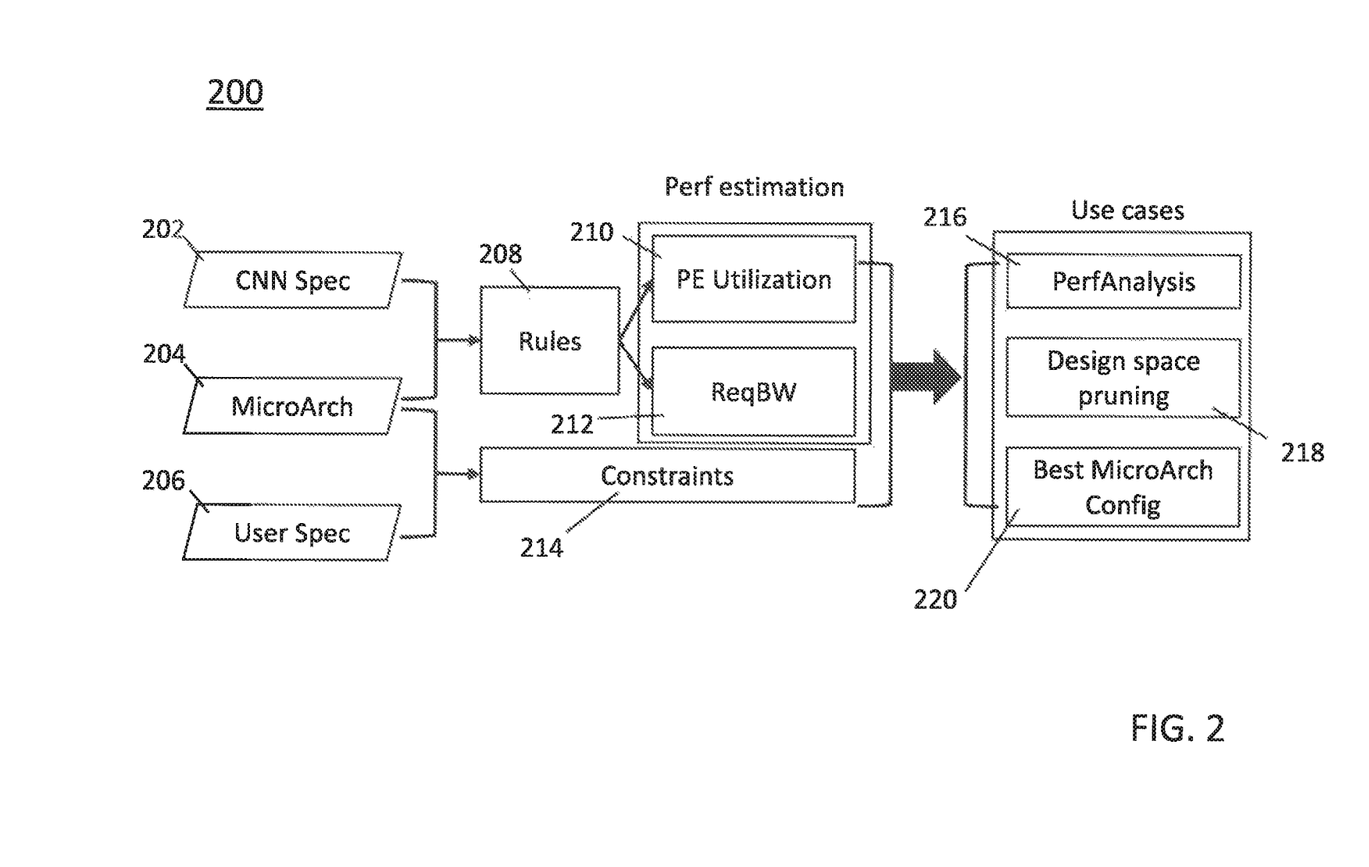
FIG. 2 depicts in flowchart format an exemplary embodiment of the present invention.

As an overview of the method underlying the present invention, FIG. 2 shows in flowchart format the stages of the method 200 underlying the present invention. The method of the present invention develops a convolution processing model by defining parameters based on 1) the convolution specification 202 and 2) the MicroArch specification 204 to represent design spaces for Cony mappings. In the method of the invention, the design spaces are represented as a set of Rules 208 and Constraints 214 (as derived from parameters from the MicroArch specification 204 and a User specification 206) expressed using the parameters.

Estimated performances 210, 212 are then formulated using these parameters to quantify the benefits of each design choice. The Rules 208 are used to formulate the performance per mapping, and the Constraints 214 (using parameters from the MicroArch specification 204 and possibly user inputs 206) are used to prune the invalid mapping options.

These performance estimates can then be used for 1) performance analysis 216, 2) design space pruning 218, and 3) proposal of the best MicroArch configuration 220. The method of the present invention could also be incorporated into a software runtime program that controls mapping of convolution computation into a 2-D hardware accelerator.

The CNN Specification Parameters

Figure 3:
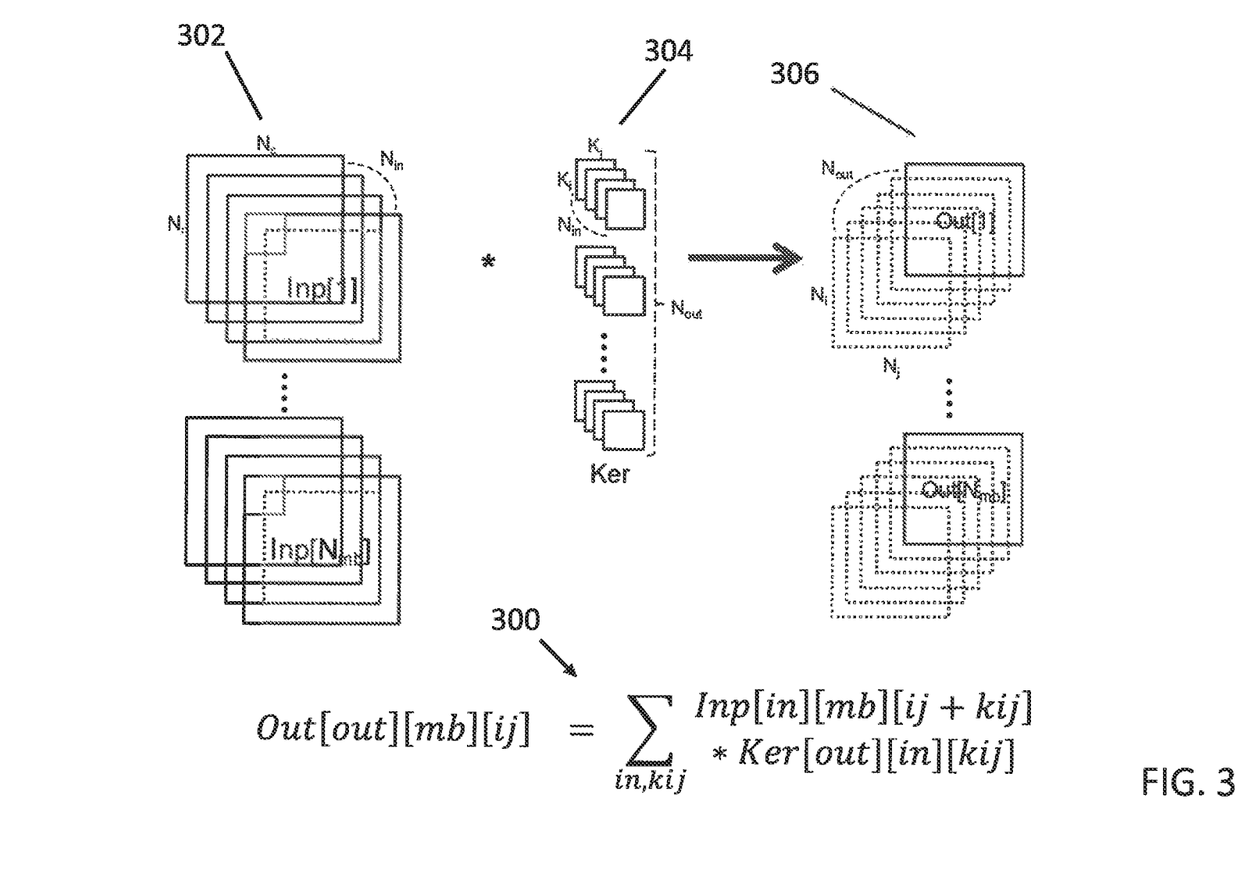
FIG. 3 exemplarily shows the convolutional processing.

As explained exemplarily in FIG. 3, the present invention involves convolutional processing 300 of input images 302, typically in groups of images in N channels. A kernel bank 304 provides different functions such as sharpening, blurring, edge detection, etc., that can be convoluted with each image 302 to provide convoluted output images 306 in accordance with the implemented convolution function 300. Each kernel function 304 can have different size windows for each function.

From the convolution equation 300 in FIG. 3, as follows:

$$\text{Out}[mb][ij] = \Sigma_{in,kij} \text{Inp}[in][mb][ij+kij] * \text{Ker}[out][in][kij],$$

the present inventors recognized that the convolution process can be modeled for quantification of performance as including a set having five dimensions.

$$[\text{Def}]\text{CONV} = \{in, out, ij, kij, mb\}.$$

Thus, the notation {in, mb, ij, kij, out} corresponds to {number of input feature maps, number of samples in a minibatch, rows and columns of the output feature map size, number of output feature maps}, respectively. From the pictorial view in FIG. 1, these elements correspond to the dimensions of cubes, so it is common to call them dimensions.

Moreover, from FIG. 3, it can be seen that there are three data arrays in the convolution process: Input, Kernel, Output, so that another set can be defined with three dimensions:

$$[\text{Def}]\text{ArrayType} = \{\text{Ker}, \text{Inp}, \text{Out}\}.$$

Additionally, another set of dimensions can then also be defined:

[Def] $\text{DIM}_x$: a set of dimensions that an array $x \in \text{ArrayType}$ is involved.

For example, $\text{DIM}_{Ker} = \{in, out, kij\}$, $\text{DIM}_{Inp} = \{in, ij, mb, kij\}$, $\text{DIM}_{Out} = \{out, ij, mb\}$. Thus, "DIM_x" is defined as a set of dimensions associated with x, meaning, for example, DIM_Ker={in, out, kij}, where the three elements of the set define sizes of different dimensions associated with the Kernel Ker. The number of input feature maps (in), number of output feature maps (out), and the row and column of kernel (kij) compose the kernel, as depicted in FIG. 1.

The MicroArch Specification Parameters

Figure 4:
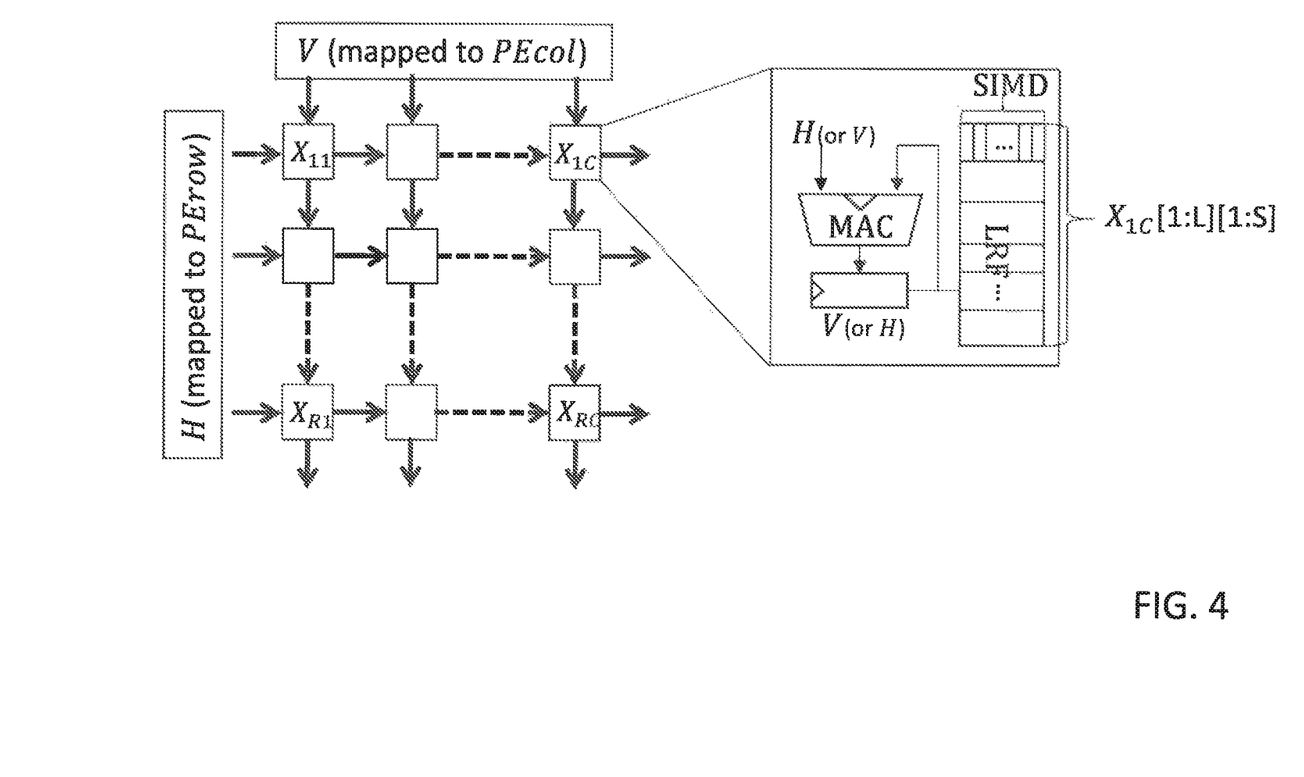
FIG. 4 exemplarily shows the 2D PE array to implement a convolutional processing.

As further illustrated in FIG. 4, the PE array of the exemplary embodiment of the present invention is SIMD-based (single input, multiple data), exemplarily presumed to have a PE array of (R×C) PEs with S SIMD lanes and L LRFs. The term LRF stands for a Local Register File, which is used for temporary data storage within the PE. LRF has a number of slots, each slot containing SIMD elements of data that would be consumed as operands of a parallel arithmetic unit called an FPU (floating-point processing unit). For example, if SIMD=8, FPU can take two sets of operands from two LRF slots, each including 8 floating-point elements, to compute element-wise multiplication and produce a vector of 8 product values. This result can be stored back to a slot of LRF.

In the context of describing mapping in this discussion, LRF refers to the dimension corresponding to the number of slots. For example, if given "map {in} to LRF", data corresponding to in=0 to in =7 will be stored into each slot of the LRF. The size of the LRF and the SIMD is independent. That is, each slot in LRF can store SIMD elements in it. Thus, the total elements can be stored in LRF would be LRF*SIMD.

Therefore, the model of the convolution processing on this exemplary machine architecture can be further developed as incorporating parameters of the MicroArch specification using a SIMD architecture on a 2-D systolic array, defined as follows:

[Def] X: a data array kept inside the LRFs of the PE array,

[Def] H, V: data arrays flowing horizontally and vertically, respectively

[Def] AvailBW: available bandwidth (BW); W: word length (e.g., 2 bytes); #Proc=C*R*S

[De] PEcol: a set of CONV={in, out, ij, kij, mb} mapped to columns of the PE array

[Def] PErow: a set of CONV mapped to rows of the PE array

[Def] LRF: a set of CONV mapped to the number of entries used inside each PE

[Def] SIMD: a set of CONV mapped to the SIMD lane of each PE

[Def] ITER: dimensions mapped for repetition while reusing X kept in the PE array The Rules and Constraints RULES: mapped dimensions PEcol, PErow, LRF, SIMD are chosen from given sets, as follows:

$$\text{PEcol} \subseteq \text{DIM}_X \cap \text{DIM}_V$$

$$\text{PErow} \subseteq \text{DIM}_X \cap \text{DIM}_H$$

The above two rules avoid replication of data in X, since edges of a 2-D PE should be mapped to a conjunction of dimensions of the adjacent data structures. This guarantees that PEcol≠PErow, since DIM_X intersect DIM_H intersect DIM_V is a null set from the problem definition.

$$\text{LRF} = \begin{cases} \text{LRF}_{X \cap V} \subseteq \text{DIM}_X \cap \text{DIM}_V & \text{or} \\ \text{LRF}_{X \cap H} \subseteq \text{DIM}_X \cap \text{DIM}_H & \text{or} \\ \text{LRF}_{H \cap V} \subseteq \text{DIM}_X \cap \text{DIM}_H \cap \text{DIM}_V = \emptyset \end{cases}$$

Since X is kept in LRF, LRF dimension should be one of the dimensions in X. The above three rules signify that there can be three possible choices, where the last case, DIM_X intersect DIM_H intersect DIM_V is a null set from the problem definition.

$$SIMD = \begin{cases} SIMD_{X \cap V} \subseteq DIM_X \cap DIM_V & \text{or} \\ SIMD_{X \cap H} \subseteq DIM_X \cap DIM_H & \text{or} \\ SIMD_{H \cap V} \subseteq DIM_H \cap DIM_V \end{cases}$$

The above three rules signify that the SIMD dimension is mapped in manner similar as LRF. One difference is that in the $3^{rd}$ choice (of SIMD_H-intersect-V), DIM_X is not involved, since X can be replicated over SIMD times for each slot.

$$ITER \subseteq (DIM_H \cup DIM_V) - DIM_X$$

The above rule signifies a set of dimensions independent to X, thus X can be reused over these dimensions.

CONSTRAINTS: Each dim mapped to {PEcol, PErow, LRF, SIMD} is associated with sizes $\leq \{N_{in}, N_{out}, N_{ij}, N_{mb}, N_{kij}\}$ constrained by MicroArch {R,C,L,S}

For example, the exemplary MicroArch configuration of FIG. 4 would have constraints: |PEcol|≤C, |PErow|≤R, |LRF|≤L, |SIMD|≤S, |ITER|=I

[Def] |Y|: product of sizes of all the dimensions in a set $$Y \subseteq \{in, out, ij, kij, mb\}.$$

In the above expression, |Y| merely explains the concept of the total assigned dimension size. For example, if PEcol={in, out}, then |PEcol| is the product of dimensions mapped to in and out, each of which would be smaller than Nin and Nout, respectively.

Other constraints defined by a specific MicroArch or by users can be added. For example, in a specific MicroArch, the banked memory, PEcol or PErow may not be able to include indexing ij, since Inp requires all to all access across the banks. A possible user specification might be a user to specify a MinExpectedPEUtil, AvailBW, $\{R_{max}, C_{max}, L_{max}, S_{max}\}$, etc.

The Performance Estimations

Based on the parameters defined above, performance metrics can now be quantified, as indicated below for the exemplary embodiment described above.
  PE utilization (as a preferred embodiment, but can be extended to other metrics)
    [Def] Overhead(X): Required cycles to bring in/out data array kept in LRF $$\text{Overhead}(X) = (X == \text{Out}) ? 2 * \frac{R*C*S*L*W}{AvailBW} : \frac{R*C*S*L*W}{AvailBW} \text{ (cycles)}$$

$$\bullet [Def] MinCycles = \frac{TotalSize = N_{in}*N_{out}*N_{ij}*N_{mb}*N_{kij}}{\#Proc = C*R*S}$$

$$[Def] EstmCycles = \left\lceil \frac{N_{in}}{P_{in}} \right\rceil * \left\lceil \frac{N_{out}}{P_{out}} \right\rceil * \left\lceil \frac{N_{ij}}{P_{ij}} \right\rceil * \left\lceil \frac{N_{mb}}{P_{mb}} \right\rceil * \left\lceil \frac{N_{kij}}{P_{kij}} \right\rceil * LRF +$$

$$\frac{MinCycles}{RF(X)} * \text{Overhead}(X)$$

$P_{dim}$: product of sizes of dim mapped in any of {PEcol, PErow, LRF, SIMD} For example, if in dimension is mapped only in PEcol={in}, then $P_{in}$=|PECOl|

$$\bullet [Def] PEUtil = \frac{MinCycles}{EstmCycles}$$

Required memory bandwidth and overhead
  [Def] RF(A): Reuse factor of data array A∈ArrayType

[Def] RF(X)=I*|SIMD_{H∩V}|

[Def] RF(H)=C*|SIMD_{X∩V}|*|LRF_{X∩V}|

[Def] RF(V)=H*|SIMD_{X∩H}|*|LRF_{X∩H}|

[Def] ReqBW(A): Required memory bandwidth to read/write data array A ∈ ArrayType $$ReqBW(A) = \\ (A) = (A == \text{Out}) ? \frac{2*(\#Proc*W)}{RF(A)} : \frac{(\#Proc*W)}{RF(A)} \text{ bytes/cycle}$$

The above equation doubles the Output data structure size for determining the required bandwidth. This is because a typical convolution computation looks like: Out=Out+ Inp*Ker. As can be seen, Out is first loaded, then updated with Inp*Ker, requiring twice larger bandwidth.

Procedure

Figure 5:
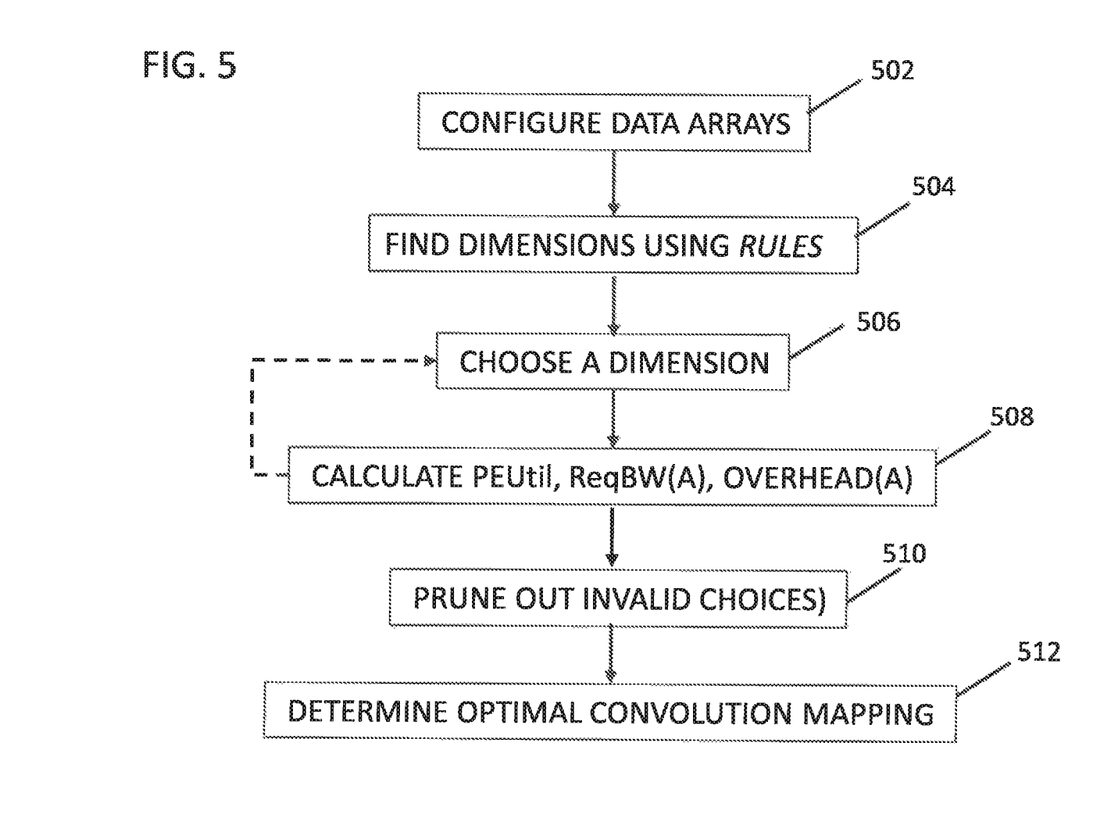
FIG. 5 shows a flow chart of the process of an exemplary embodiment of the present invention.

FIG. 5 shows a flowchart for the basic process of applying the present invention for a simple analysis in which a user makes selections to set up the tool for a single analysis. In step 502 the data arrays are configured by choosing which data array to be kept in LRF, and which to flow horizontally or vertically.

In step 504, the Rules specification provides the mapped dimensions PEcol, PErow, LRF, SIMD for the specified CNN.

In step 506 a dimension and size are chosen from each of PEcol, PErow, LRF, SIMD, in view of any constraints such as whether banked memory, PEcol or PErow cannot include ij, since Inp requires all to all access across the banks.

Figure 6:
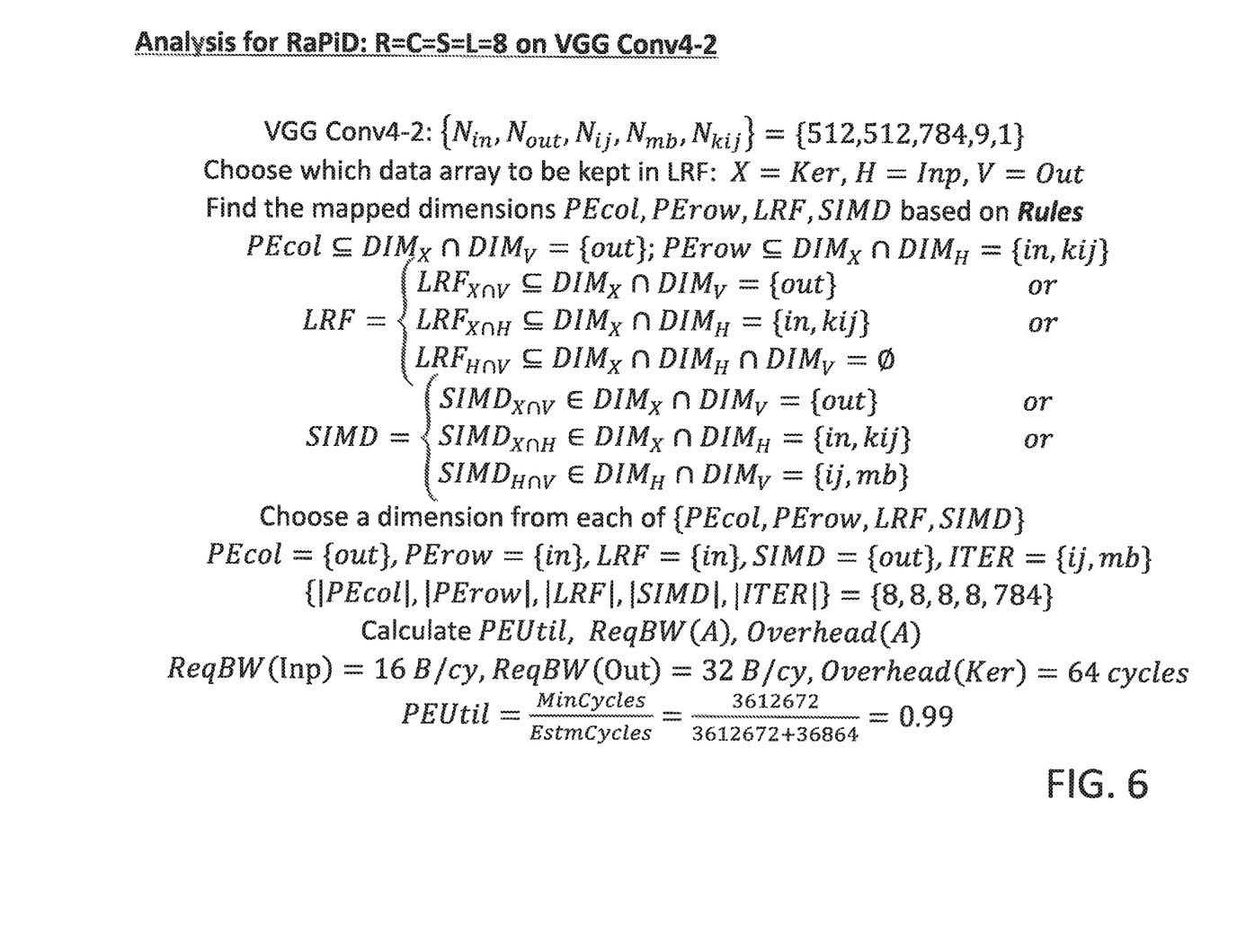
FIG. 6 shows an analysis using the present invention for one exemplary 2D PE array configuration using the VGG Con4-2 CNN.
Figure 7:
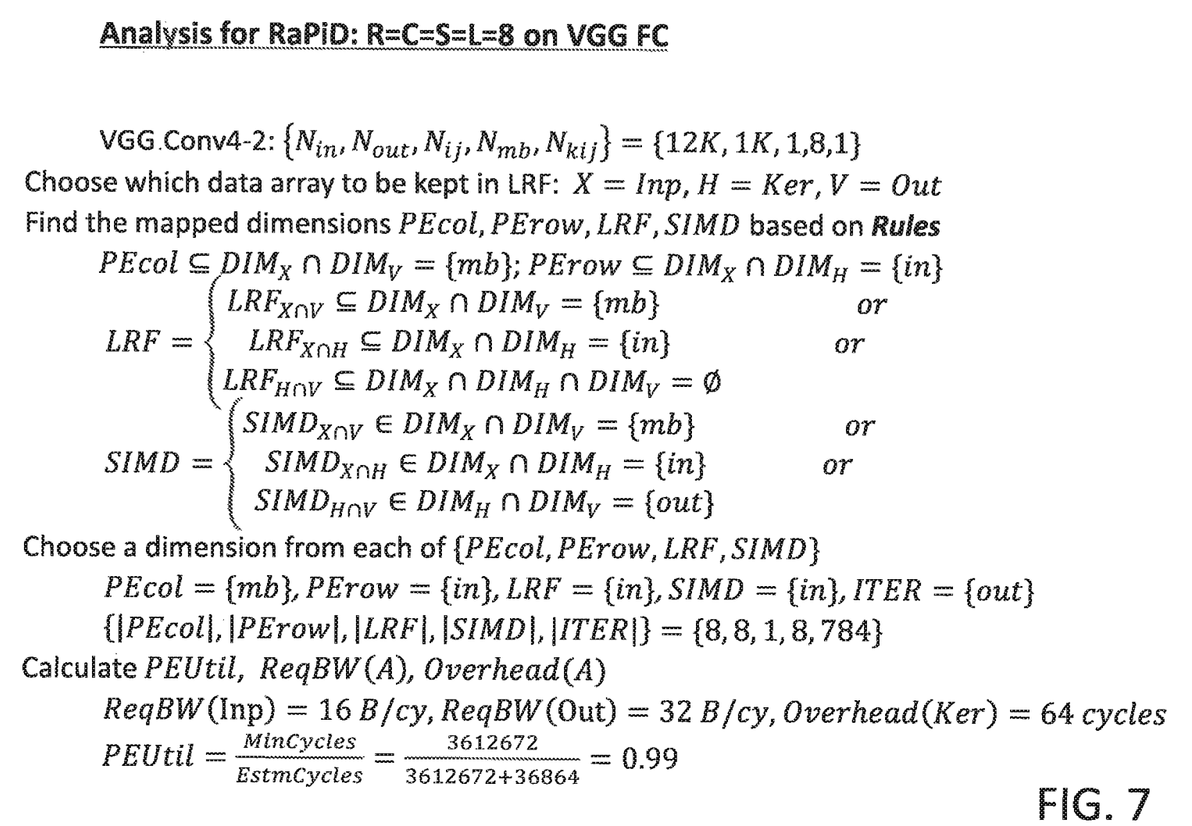
FIG. 7 shows analysis using the present invention for the same exemplary 2D PE array configuration using the VGG FC CNN.

In step 508, PEUtil, ReqBW(A) are calculated, for use for calculating 1) performance analysis, 2) design space pruning, and 3) proposal of the best MicroArch configuration. Steps 506 and 508 can be repeated by the user or iterated automatically if the tool is set up for a complete evaluation. FIG. 6 and FIG. 7 show example analyses for two CNNs, VGG Conv4-2 in FIG. 6 and VGG FC in FIG. 7. Both analyses show performance PEUtil=0.99 at the exemplary selected dimensions for PEcol, PErow, LRF, and SIMD.

Figure 8:
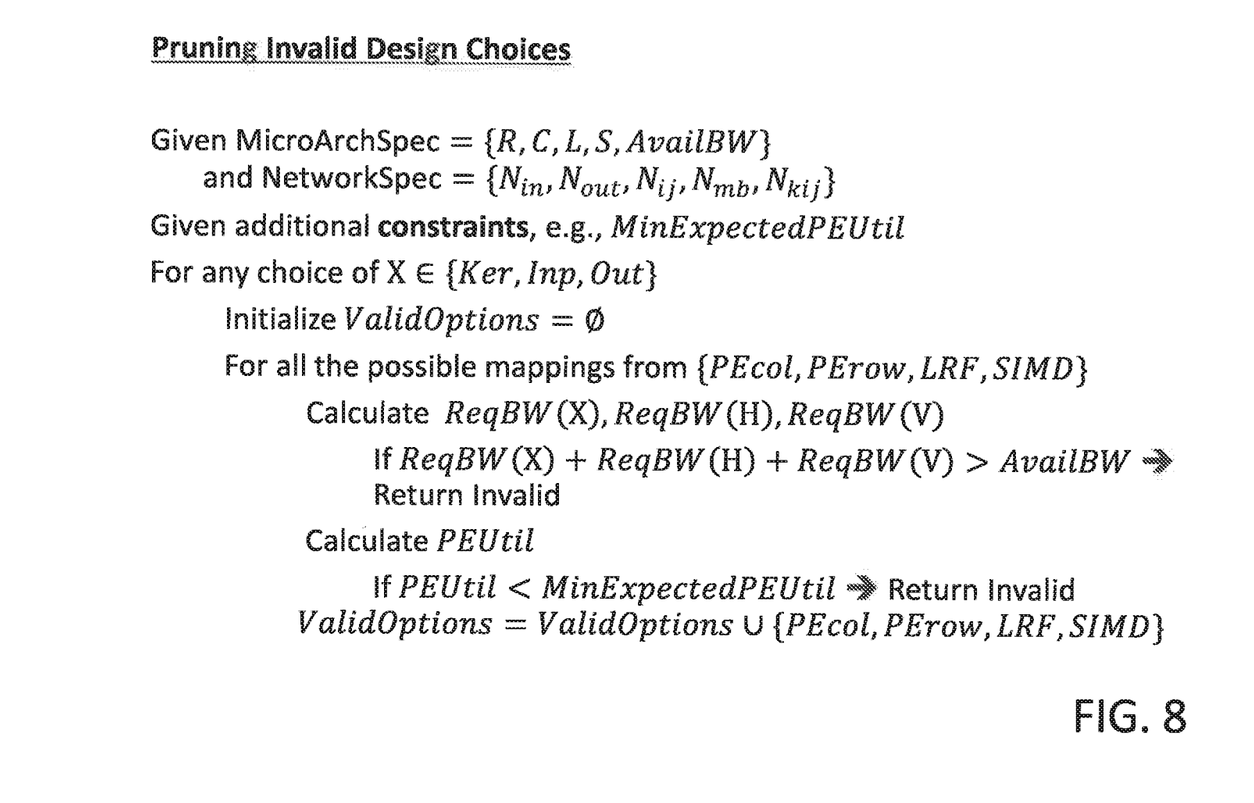
FIG. 8 shows exemplary pseudocode for pruning invalid design choices.
Figure 9:
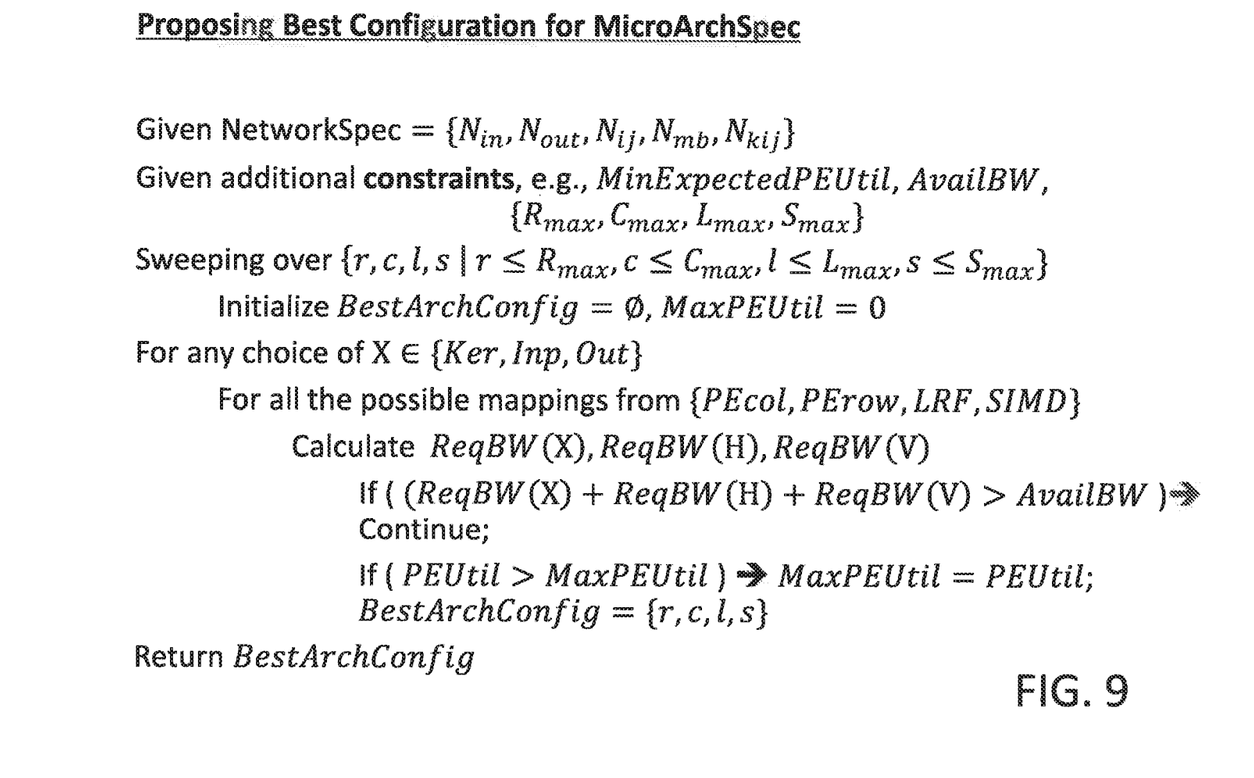
FIG. 9 shows exemplary pseudocode for determining the optimal MicroArch configuration.

In step 512, constraints provide input data that permit the possible design choices to be pruned out, and determination of optimal design in step 514. FIG. 8 provides exemplary pseudocode for pruning based on minimum expected PEUtil. FIG. 9 provides exemplary pseudocode for determining optimal design by determining the best performance PEUtil.

The present invention is used to explore the convolution mapping space for any desired convolutional processing, including a determination of an optimal configuration. The method can be implemented as an application program in which a user enters parameters and monitors calculations. The method can also be implemented as a software component that automatically extracts parameter data from one or more databases and automatically determines optimal design choices. Another possibility is a software tool that automatically determines the optimal design and automatically configures the system to implement the optimal design.

The software to implement the method of the present invention could be located on the same computer that will execute the convolution processing or could be located remotely on a server accessible via a network. The method could also be implemented using a cloud service, as described below.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
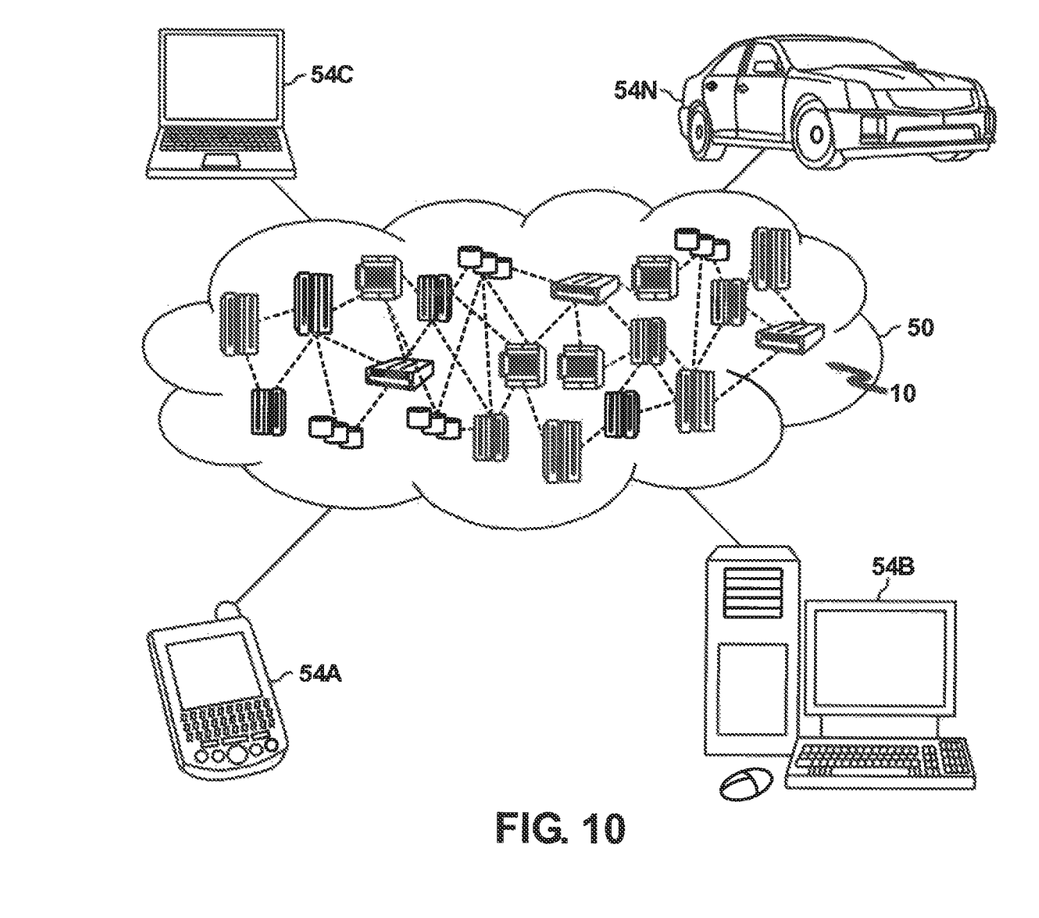
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
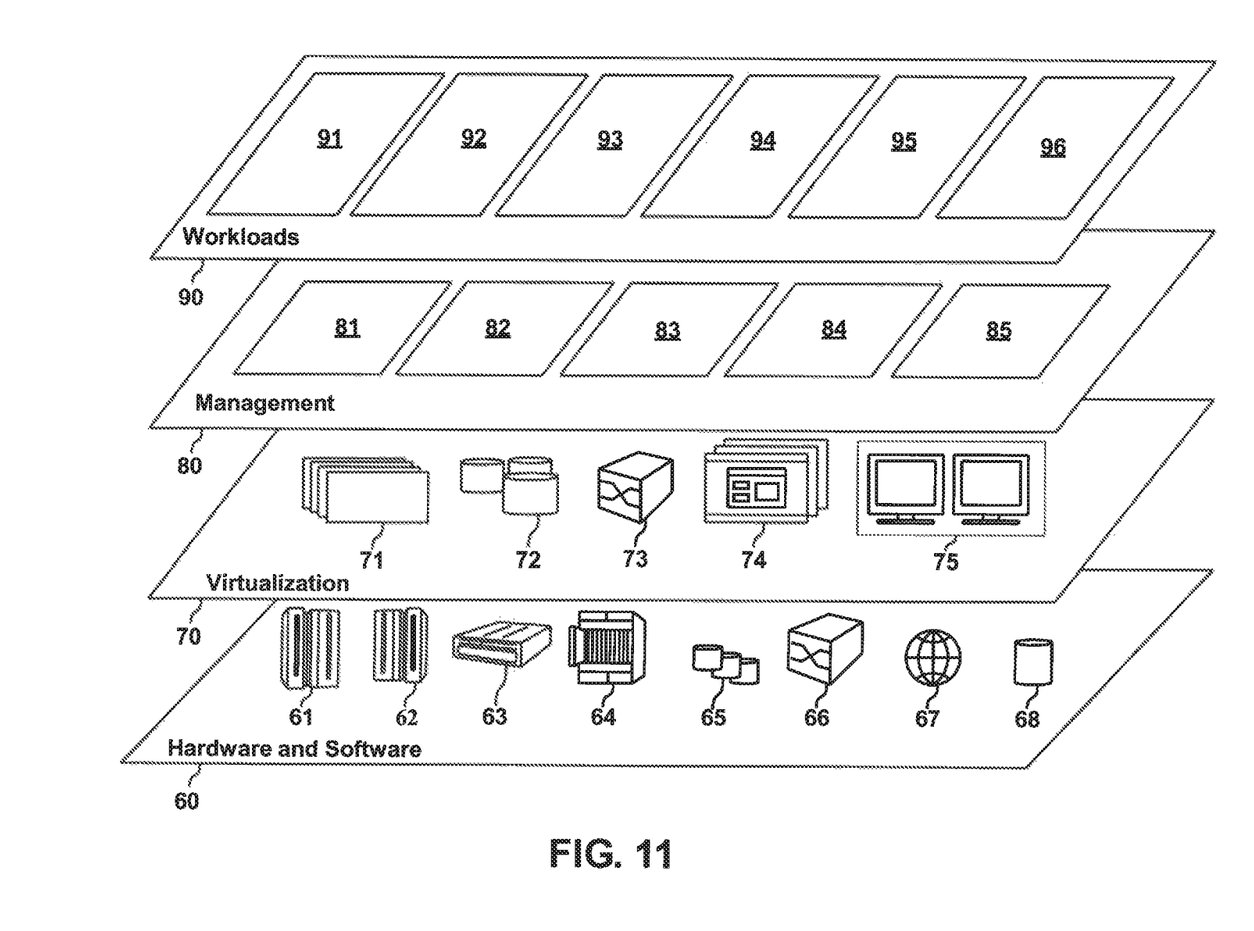
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the DNN mapping tool 96 described in the present invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicants' intent is to encompass the equivalents of all claim elements, and no amendment to any claim of the present application should be construed as a disclaimer of any interest in or right to an equivalent of any element or feature of the amended claim.

What is claimed is:

1. A method for improving performance of a predefined Deep Neural Network (DNN) convolution processing on a computing device, the method comprising:
    inputting parameters as input data into a processor configured to, on a computer, formalize a design space exploration of a convolution mapping on a predefined DNN computer architecture that will execute the predefined DNN convolution processing, wherein the parameters are predefined as guided by a specification for the predefined DNN convolution processing to be implemented by the convolution mapping and by a microarchitectural specification for the processor that will execute the predefined DNN convolution processing;
    calculating, by the processor, performance metrics for executing the predefined DNN convolution processing on a two-dimensional systolic processor, as functions of the parameters, as proxy estimates of performance of different possible design choices to implement the predefined DNN convolution processing for output, wherein the calculating, by the processor, of the performance metrics for executing the predefined DNN convolution processing is to prune invalid mapping options having calculated performance metrics that are less than minimum expected performance metrics, and architecture configurations to achieve desired performance goals, including low energy and high throughput;
    determining an optimal convolution mapping onto a three-dimensional (3D) processor array for the predefined DNN convolution processing from the calculating, wherein the optimal convolution mapping includes calculated performance metrics that are greater than maximum expected performance metrics; and
    performing the predefined convolution processing onto a plurality of processing elements connected as the three-dimensional processor array,
    wherein three data arrays in the predefined DNN convolution processing includes input, kernel, output, such that another set is defined with three dimensions.

2. The method of claim 1, wherein possible convolution mappings are mappings onto a predetermined accelerator architecture configuration.

3. The method of claim 1, further comprising:
    receiving input data defining one or more constraints; and
    identifying invalid convolution mapping options based on the constraints.

4. The method of claim 1, as implemented on a second computer different from the computing device that will execute the predefined DNN convolution processing.

5. The method of claim 4, as implemented on one of: a server remote from the computing device; and as a cloud service.

6. The method of claim 1, as embodied as a set of machine-readable instructions on a non-transitory memory device.

7. A method for exploring a design space for mapping convolutional layers of a Deep Neural Network (DNN) onto a plurality of processing elements connected as a 2-dimensional (2D) or a 3-dimensional (3D) systolic processor array, the method comprising:
    inputting parameter values into a processor from a microarchitecture specification that defines configuration aspects of the processing elements;
    inputting parameter values into the processor from a specification that defines a convolutional processing;
    calculating, by the processor, performance metrics for executing a predefined DNN convolution processing on the 2D systolic processor array or the 3D systolic processor array, as functions of the parameter values, as proxy estimates of performance of different possible design choices to implement the predefined DNN convolution processing for output, wherein the calculating, by the processor, of the performance metrics for executing the predefined DNN convolution processing is to prune invalid mapping options having calculated performance metrics that are less than minimum expected performance metrics, and architecture configurations to achieve desired performance goals, including low energy and high throughput;

determining an optimal convolution mapping based on the calculating, wherein the optimal convolution mapping includes calculated performance metrics that are greater than maximum expected performance metrics; and performing the predefined DNN convolution processing onto a plurality of processing elements connected as the 2D systolic processor array or the 3D systolic processor array, wherein three data arrays in the predefined DNN convolution processing includes input, kernel, output, such that another set is defined with three dimensions or two dimensions.

8. The method of claim 7, further comprising determining an optimal configuration for implementing the predefined DNN convolution processing.

9. The method of claim 7, further comprising: receiving data for one or more constraints; and identifying invalid convolution mapping options based on the constraints.

10. The method of claim 7, as implemented on a computer different from a computing device comprising the 2D systolic processor array that will execute the predefined DNN convolution processing.

11. The method of claim 7, as implemented on a computer different from a computing device comprising the 2D systolic processor array.

12. The method of claim 11, as implemented on one of: a server remote from the computing device; and as a cloud service.

13. The method of claim 7, as implemented as a software tool on a computing device comprising the 2D systolic processor array that will execute the predefined DNN convolution processing.

14. The method of claim 7, as embodied as a set of machine-readable instructions on a non-transitory memory device.

15. An apparatus, comprising:
a processor; and
a memory device accessible by the processor, the memory device storing a set of instructions that permit the processor to execute a method of optimizing a mapping of convolutional layers of a Deep Neural Network (DNN) onto a plurality of processing elements connected as a 2-dimensional (2D) systolic processor array or a 3-dimensional (3D) system processor array, the method executed by the processor, comprising:
inputting parameter values into the processor from a microarchitecture specification that defines configuration aspects of the processing elements;
inputting parameter values into the processor from a specification that defines a predefined DNN convolution processing;
calculating, by the processor, performance metrics for executing the predefined DNN convolution processing on the 2D systolic processor array or the 3D systolic processor array, as functions of the parameter values, as proxy estimates of performance of different possible design choices to implement the predefined DNN convolution processing, wherein the calculating, by the processor, of the performance metrics for executing the predefined DNN convolution processing is to prune invalid mapping options having calculated performance metrics that are less than minimum expected performance metrics, and architecture configurations to achieve desired performance goals, including low energy and high throughput;
inputting one or more constraints that permit the processor to eliminate invalid design choices;
determining an optimal convolution mapping onto the 2D systolic processor array or the 3D systolic processor array for the predefined DNN convolution processing for processing of images, wherein the optimal convolution mapping includes calculated performance metrics that are greater than maximum expected performance metrics; and
performing the predefined DNN convolution processing onto a plurality of processing elements connected as the 2D systolic processor array or the 3D systolic processor array,
wherein three data arrays in the predefined DNN convolution processing includes input, kernel, output, such that another set is defined with three dimensions.

16. The apparatus of claim 15, wherein the method is implemented as a software tool that automatically configures an optimal configuration for performing the predefined DNN convolution processing.

17. The method of claim 1, as implemented as a software tool on the computing device that will execute the predefined DNN convolution processing,
wherein the convolution mapping is implemented onto a hardware accelerator, and
wherein mapped dimensions follow a predetermined rule to avoid replication of data based on edges of the plurality of processing elements.

18. The method of claim 7, as implemented as a software tool on a computing device that will execute the predefined DNN convolution processing,
wherein the mapping is implemented onto a hardware accelerator, and
wherein mapped dimensions follow a predetermined rule to avoid replication of data based on edges of the plurality of processing elements.

* * * * *